United States Patent Office 2,849,289
Patented Aug. 26, 1958

2,849,289

PROCESS FOR THE DECOMPOSITION OF TITANIUM ORE

Hans Zirngibl, Leverkusen-Bayerwerk, and Gerhard Heinze, Leverkusen, Germany, assignors to Farbenfabriken Bayer Aktiengesellschaft, Leverkusen, Germany, a corporation of Germany No Drawing. Application April 19, 1956
Serial No. 579,148

Claims priority, application Germany April 21, 1955

5 Claims. (Cl. 23—117)

This invention relates to a process for the decomposition of titanium ore.

It is known that ilmenite can be decomposed by boiling with sulphuric acid of medium concentration. A process is also known in which sulphuric acid with approximately 63% of $H_2SO_4$ is used in an excess of 50% over the amount theoretically necessary, in order to obtain a paste of titanic acid and water-soluble iron sulphate from ilmenite. This process is carried out in an autoclave at approximately 180° C. A disadvantage of this process is that a large part of the excess sulphuric acid cannot be separated and re-circulated, but remains adhering in the paste and is lost when the iron sulphate is extracted, and that the titanic acid has to be decomposed afresh after the extraction when it is used, for example, for the manufacture of pigment.

In accordance with another known process, titanium ore is boiled at 130° C. with sulphuric acid, which contains 55% of $H_2SO_4$ and is saturated at room temperature with ferrosulphate and is used in an excess of at least 100% of the amount theoretically necessary for forming the salt, in order that both titanium and iron are obtained in sulphuric acid solution. By increasing the $H_2SO_4$ content of this solution to 75% by means of admixed concentrated sulphuric acid and subsequent cooling to room temperature, the iron sulphate is precipitated, and the separated solution is mixed with water to hydrolyse the dissolved titanium salt, until finally there is a dilute acid containing approximately 20% of $H_2SO_4$, all the excess free acid being lost.

A process for the decomposition of titanium ore with excess sulphuric acid has now been developed in which this excess, conducted in circulation, is fully utilised within the process; the process can be conducted continuously and, without precipitated titanic acid being again decomposed, yields extracts of the composition which is usual in the preparation of titanium pigment. These advantages and other advantages are made possible by the use of a very large excess of acid, which excess must be at least 150%. The $H_2SO_4$ content of this excess circulation acid should be between 45 and 75%, preferably 55 to 65%. Under these conditions the reaction mixture formed is readily mobile, that is to say, it can flow and be stirred, but both the titanium and the iron are obtained in the form of crystals which can be filtered off very easily and the titanium exists as soluble titanyl sulphate.

The decomposition is carried out at temperatures higher than 130° C., preferably at 150 to 175° C. If a circulation acid is used which has less than about 60% of $H_2SO_4$, it is preferred to operate in an autoclave under pressure in order to reach the high temperature.

The course of the exothermic decomposition reaction, which is different for example with ilmenites from different sources, can be so controlled by varying the amount of circulation acid used that the speed thereof and thus the temperature of the reaction mixture remains within the required limits. The filtration properties of the sulphates being separated out are also influenced thereby. In order to obtain the reaction product in a condition in which it can flow and be filtered satisfactorily, the amount of circulation acid is to be at least one and a half times the amount of reaction sulphuric acid which is consumed.

The reaction sulphuric acid necessary for forming the sulphate can be added to the circulation acid in a concentration which is within the range of concentration of the circulation acid itself, and can for example be obtained by evaporating the dilute acid which is formed in the hydrolysis of the titanium liquor. It can, however, also be introduced as concentrated sulphuric acid and may be added in admixture with the titanium ore, or as a mixture of concentrated sulphuric acid and that obtained by evaporating dilute acid to an $H_2SO_4$ content of 55 to 65%. If the circulation acid is preheated to approximately 120–130° C., the temperature of the reaction is automatically adjusted by the heat of reaction when the mixture of titanium ore and concentrated sulphuric acid is added. No supplementary heating is necessary if the reaction equipment is efficiently heat insulated and, as previously explained, the reaction can be controlled by the amount of circulation acid which is used.

The reaction period is up to two hours; even one hour is sufficient if the mixture is vigorously stirred. Such a thorough decomposition is produced by this process that 99% of the titanium contained in the ore can be obtained as soluble salt.

Due to the decomposition mixture being in a flowable condition, the process can very easily be carried out continuously. For this purpose, there are either employed decomposition vessels, i. e. autoclaves or stirrer-type vessels, connected in series, depending on the boiling conditions, or a rotary drum with built-in weirs or a tube system or the like. As compared with the prior known decomposition processes, therefore, the process of the present invention presents considerable technical and economic advantages, particularly the elimination of troublesome evolution of vapour, due to the accurate control of the reaction which is possible by adjusting the amount of circulation acid used, almost complete exploitation of the initial material due to high degree of decomposition, and the high yield per unit of time and volume of the technical installation due to the continuous working method, the short reaction period and the high rate of solution of the precipitated fine sulphate crystals.

The invention is further illustrated by the following examples without being restricted thereto.

*Example 1*

5000 g. of a circulation acid with 60% of $H_2SO_4$ and preheated to 130° C. are mixed in a vessel equipped with a high-speed stirrer with a mixture of 1000 g. of ilmenite and 1600 g. of concentrated sulphuric acid, and stirred for two hours. In a few minutes, the temperature rises to the boiling point of the mixture, which is in the region of 165° C. At the end of the reaction, during which about 50 to 100 g. of water evaporate, the temperature is between 155 and 165° C. The acid-crystal mixture which is then present is cooled to 60° C. and filtered. Approximately 2700 g. of sulphates and the amount of circulation acid introduced are recovered. The filter cake is then washed with water. The amount of water used in the washing depends on the ratio between the proportion of free acid and the sum of the proportions of free acid and acid bonded as titanyl sulphate which is required for the further processing of the sulphates in the subsequent liquor. If this ratio is to be 30 to 40%, it is expedient to wash with 500 g. of water and the discharging acid wash liquor is added to the preceding filtrate. The total filtrate, the amount of which is then 5200 g. and which contains approximately 59% of $H_2SO_4$, 1% of Fe and 0.4% of $TiO_2$ and is saturated with iron sulphate and titanium sulphate, is heated again at 130° C. The small amount of water contained in the added wash liquor is evaporated and thus the circulation acid with 60% of $H_2SO_4$, is recovered as it was introduced at the commencement of the decomposition.

The filter cake is extracted in the ratio of 1:0.8 with water at a temperature of 60° C., the sulphates being thereby dissolved. During the extraction, the trivalent iron is reduced with a reducing agent, preferably scrap iron, until a small amount of trivalent titanium is formed. The liquor is allowed to settle, filtered, evaporated in the usual way and the ferrosulphate is crystallised and removed by centrifuging. Each litre of the titanium liquor obtained in this manner contains 250–260 g. of $TiO_2$, 40 g. of Fe and altogether 500 g. of $H_2SO_4$ (free acid+sulphates). 35–40% of the sum of the free and titanium-bonded sulphuric acid are free acid. The final yield of titanium dioxide is 98.5–99.5% of that contained in the ilmenite introduced.

*Example 2*

Three stirrer-type vessels are connected in series to form a system, and 5000 kg. of sulphuric acid, containing 60% of $H_2SO_4$ and heated to 130° C., and a mixture of 1000 kg. of ilmenite and 1600 kg. of concentrated sulphuric acid, are continuously introduced into the first of these vessels. The throughflow speed is so adjusted that the residence period of the mixture in the system of vessels is two hours. The mixture of acid and crystals leaving the system runs into a fourth vessel, in which it is cooled to the filtration temperature by circulating acid flowing in counter-current. The filter yields about 1000 kg. of moist filter cake per hour and per square metre. 250 kg. of water per hour are used for washing purposes. The circulation acid flowing back into the system is finally heated to 125–140° C. with a submerged burner; approximately 50–100 kg. of water are to be evaporated every hour.

*Example 3*

2100 kg. of circulation acid containing 50% of $H_2SO_4$ and at a temperature of 120° C. are placed in a stirrer-type autoclave and a mixture of 600 kg. of ilmenite and 950 kg. of concentrated sulphuric acid is added. After a few minutes, the temperature in the autoclave rises to approximately 170° C. and causes a pressure of 2.6–2.8 atmospheres. After a reaction period of one hour, the pressure is relaxed, and the reaction product is cooled to 60° C. and filtered. Remaining on the filter are about 1800 kg. of sulphate, which are covered with 225 kg. of water. The filtrate, including wash liquor, again contains 50% of $H_2SO_4$, as well as about 1% of Fe and 0.4–0.5% of $TiO_2$, and can be used as circulation acid for a fresh batch after heating to 120° C. without evaporation of water. The yield of soluble titanium is 99.5%. This autoclave process can also be carried out continuously in the same way as that described in Example 2.

We claim:

1. A process of decomposing oxidic titanium ores with excess sulfuric acid which consists in that the ore to be decomposed had added to it, in addition to the amount of sulfuric acid which is stoichiometrically required to convert the titanium and iron content into titanyl sulfate and ferrous sulfate, an excess of sulfuric acid having a concentration of $H_2SO_4$ of between 45 and 75% by weight amounting to at least one and a half times the quantity of $H_2SO_4$ stoichiometrically required to convert the titanium and iron content into titanyl sulfate and ferrous sulfate, whereby said sulfates precipitate out, said decomposition being effected at a temperature of between 130 and 180° C., the excess of said acid being separated from said sulfates and reused.

2. A process as claimed in claim 1, wherein said excess amount of sulfuric acid has a concentration of $H_2SO_4$ of between 60 and 65 percent by weight and the decomposition is carried out at a temperature between 150 and 175° C.

3. A process as claimed in claim 1, wherein said excess amount of sulfuric acid has a concentration of $H_2SO_4$ of between 55 and 60 percent by weight and the decomposition is carried out at a temperature between 150 and 175° C. in a pressure vessel.

4. A process as claimed in claim 1, wherein said excess sulfuric acid is preheated to a temperature between 120 and 140° C.

5. A process as claimed in claim 1, wherein the decomposition process is carried out continuously.

References Cited in the file of this patent

UNITED STATES PATENTS

| | | |
|---|---|---|
| 1,196,031 | Rossi et al. | Aug. 29, 1916 |
| 1,357,690 | Coffelt | Nov. 2, 1920 |
| 1,504,670 | Blumenfeld | Aug. 12, 1924 |
| 2,413,641 | McAdam | Dec. 31, 1946 |